United States Patent [19]

Holland et al.

[11] Patent Number: 4,517,832
[45] Date of Patent: May 21, 1985

[54] AIR SUSPENSION SYSTEM SERVICE DIAGNOSTICS

[75] Inventors: Scott B. Holland, Sterling Heights; Edward S. Greene, Allen Park; David A. Kowalski, Romulus; Bruce D. Strachan, Canton, all of Mich.

[73] Assignee: Ford Motor Company, Dearborn, Mich.

[21] Appl. No.: 570,101

[22] Filed: Jan. 12, 1984

[51] Int. Cl.³ ............................................. G01M 17/04
[52] U.S. Cl. ..................................... 73/118; 340/52 R
[58] Field of Search ................... 73/118, 39; 280/6 R, 280/6 H; 340/136, 52 R

[56] References Cited

U.S. PATENT DOCUMENTS

| 3,718,033 | 2/1973 | Petersen | 73/71.7 |
| 3,821,893 | 7/1974 | Klinger et al. | 73/118 |
| 4,017,099 | 4/1977 | Hegel et al. | 280/707 |
| 4,168,840 | 9/1979 | Graham | 280/6 R |
| 4,185,845 | 1/1980 | Misch et al. | 280/6 H |
| 4,323,266 | 4/1982 | Savage | 280/707 |
| 4,390,187 | 6/1983 | Maeda | 280/6 R |

Primary Examiner—Jerry W. Myracle
Attorney, Agent, or Firm—Paul K. Godwin, Jr.; Robert D. Sanborn

[57] ABSTRACT

A method of diagnosing component failure that may occur in a vehicular air suspension system utilizing height sensors and air springs mounted between sprung and unsprung components of the vehicle, as well as air flow control valves, and an air compressor. The method sequences the various components through their intended functional capabilities and provides a mechanism for indicating faults in individual components.

6 Claims, 9 Drawing Figures

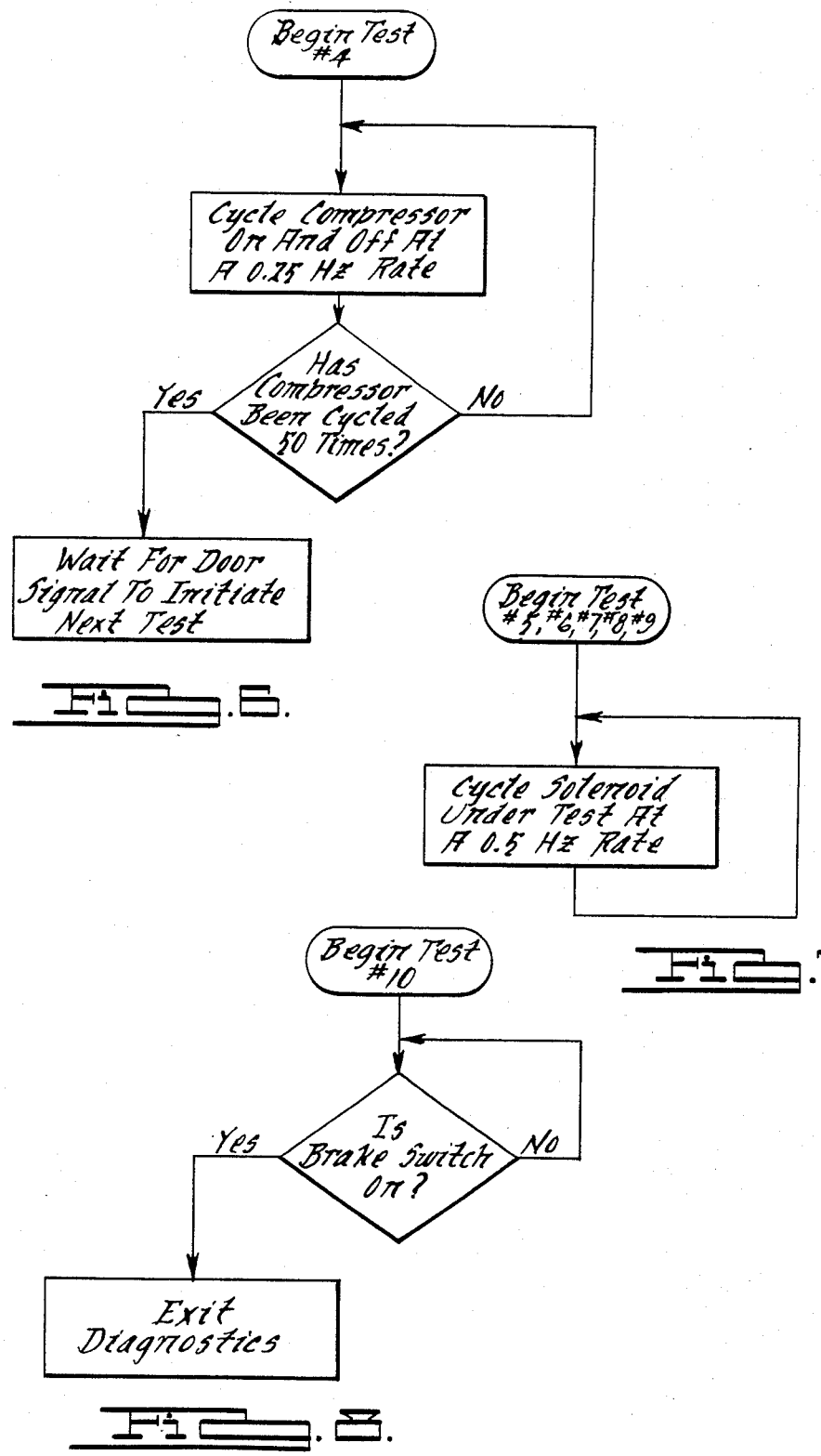

AIR SUSPENSION SYSTEM SERVICE DIAGNOSTICS

BACKGROUND OF THE INVENTION

1. Field of the Invention

The present invention is directed to the field of air suspension control systems and more specifically to the area of diagnosing failures of individual components in air suspension systems.

2. Description of the Prior Art

It is known in the prior art to provide vehicular suspension systems in which at least the rear portion of the vehicle is maintained at a particular trim level by providing compressed air to either a set of air springs or expandable shock absorbers. Supplying air or bleeding off air is the common method of adjusting the suspension system in order to maintain the trim level. In many of the prior art systems, height sensors are incorporated which are mounted between sprung and unsprung components of the vehicle to sense changes in the distance between the sprung and unsprung components and to thereby indicate whether the vehicle is in or out of its trim position.

When a failure occurs in such a system due to failure of air supplying components, the air springs or the air valves, the effect on the vehicle will make it appear at a lower than usual or a higher than usual level. Such an appearance will, of course, be apparent to the vehicle operator and to the service technician but will not necessarily indicate or pinpoint the faulty component.

SUMMARY OF THE INVENTION

The present invention is intended to provide a diagnostic sequence method whereby the individual active components of an air suspension system are selectively energized and monitored to determine their functional condition.

The present invention is embodied in an air suspension control system whereby three height sensors are mounted between sprung and unsprung components, at the respective front wheels and at the rear center of the vehicle. The height sensors are linear transducers which convert mechanical displacement between the sprung and unsprung components into digital electrical signals that reflect one of three measurable ranges of distance between the sprung and unsprung components. Those ranges are correlated as the vehicle being "too high", "correct height" or "too low". In automotive parlance those vehicle height conditions are "REBOUND", "TRIM" or "JOUNCE", respectively.

An associated microprocessor control unit is programmed, in its operational mode, to read the height sensors and accumulate readings for each one. The accumulated readings reflect the average load condition of each corresponding portion of the vehicle. The operational mode program of the control unit appropriately commands the air suspension system to either vent air from appropriate air spring(s); do nothing; or pump air into the appropriate air spring(s). The readings of the height sensors are made approximately 30 times each second and appropriate corrections to the air springs are made in order to maintain the vehicle at a TRIM condition.

The microprocessor control unit also has a diagnostic mode, which may be switched on by a technician in order to sequentially test the various components of the air suspension system by utilizing the method of the present invention. That method includes the steps of: switching the control unit into its diagnostic mode; energizing the compressor for a first predetermined period of time; opening a first electrically controllable solenoid air valve for the rear set or one of the other front located air springs; reading the height sensor measurement output for that corresponding spring or set of air springs at the end of the first period of time; comparing the height sensor output with a predetermined measurement that indicates a fully raised condition for that corresponding air spring or set of air springs; with the compressor in its de-energized state, opening that electrically-controllable solenoid air valve for a second predetermined period of time in order to bleed off the air within the corresponding air spring or set of air springs; reading the corresponding height sensor measurement output at the end of the second predetermined period of time; comparing the height sensor measurement with a predetermined measurement that indicates a fully lowered condition for that corresponding air spring or set of air springs; energizing the compressor for a third predetermined period of time; opening the same electrically controllable solenoid air valve for a third predetermined period of time; reading the corresponding height sensor measurement output during the third predetermined period of time; comparing the height sensor measurement output with a predetermined measurement corresponding to the desired trim height condition; closing the air valve and de-energizing the compressor when the height sensor reading is equal to the measurement corresponding to the desired trim height condition; and providing a fault warning whenever any of the preceding comparing steps results in an inequality at the end of the respective first, second and third time periods.

The method is sequentially performed for each of the three height sensors and their corresponding air springs of the vehicle.

The method further includes steps which provide analyzing the output of the height sensors to determine whether they are providing valid or invalid measurements, steps for cycling the air compressor relay, steps for cycling the various air valve solenoids in the system and steps for checking the function of a brake switch.

BRIEF DESCRIPTION OF THE DRAWINGS

FIG. 6 is a flow diagram illustrating the various steps involved in testing the functionality of an air compressor.

FIG. 7 is a flow diagram illustrating the solenoid air valve cycle test.

FIG. 8 is a flow diagram illustrating the brake sensor switch test.

DESCRIPTION OF THE PREFERRED EMBODIMENT

Figure 1:
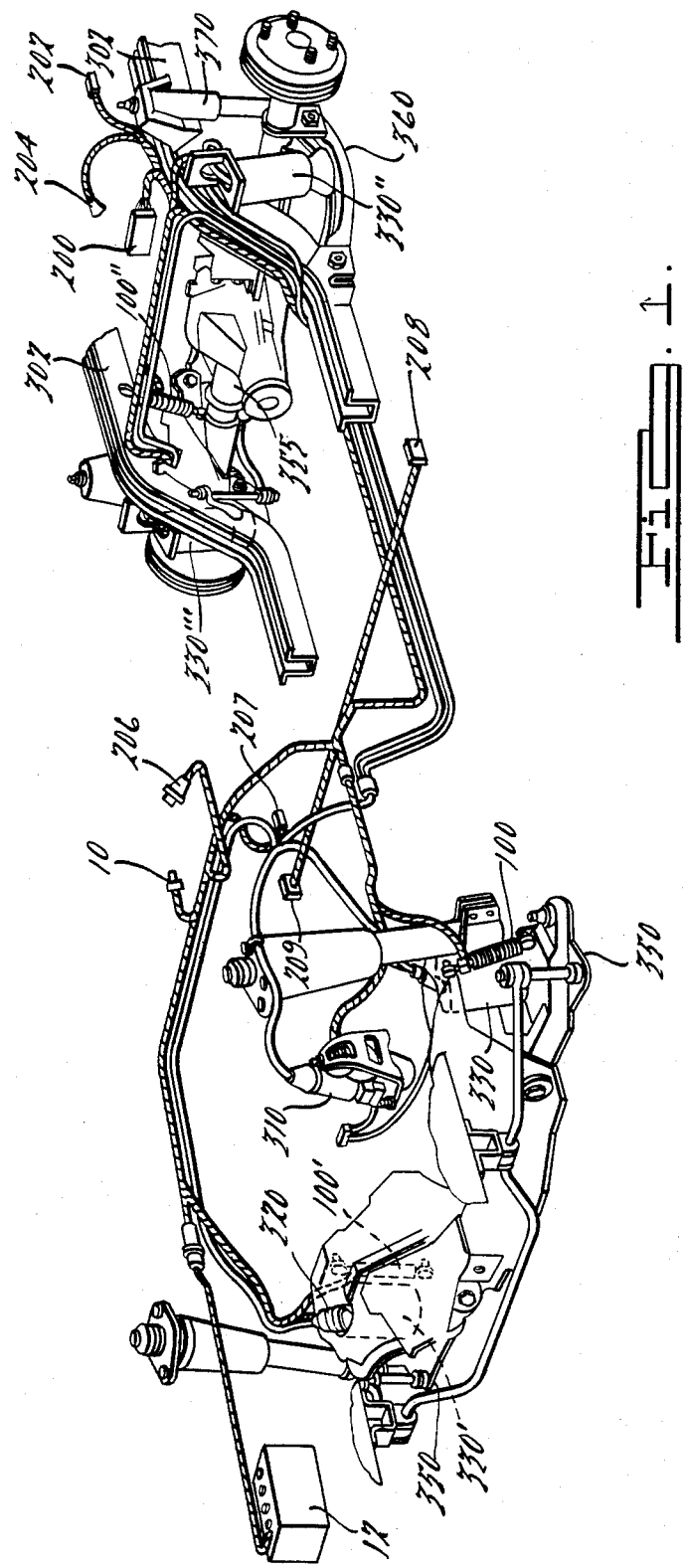
FIG. 1 is an overall view of a vehicle installed air suspension system incorporating the present invention.

The system, as shown in FIG. 1, includes air springs 330, 330', 330" and 330'" between sprung components, such as the vehicle frame 302 or the body (not shown), and unsprung components, such as the lower control arm 360 in the rear and the lower arm 350 for each steerable wheel in the front of the vehicle. Each air spring includes an electrically controlled solenoid air valve 320 which, when energized, allows air to flow into or out of the air spring. Air flow to and from the air spring is through a closed pressure system that terminates at an electrically controlled air compressor 310. Three suspension height sensors 100, 100' and 100" are utilized in the described system to sense height changes between sprung and unsprung components at each of the front corners and at the rear portion of the vehicle.

An electronic control module 200 contains an (8049) microprocessor computer 210 and individual power drivers to energize the height sensors and to responsively maintain the vehicle at a predetermined trim condition by appropriately commanding operation of the compressor 310 and solenoid valves 320.

Figure 2:
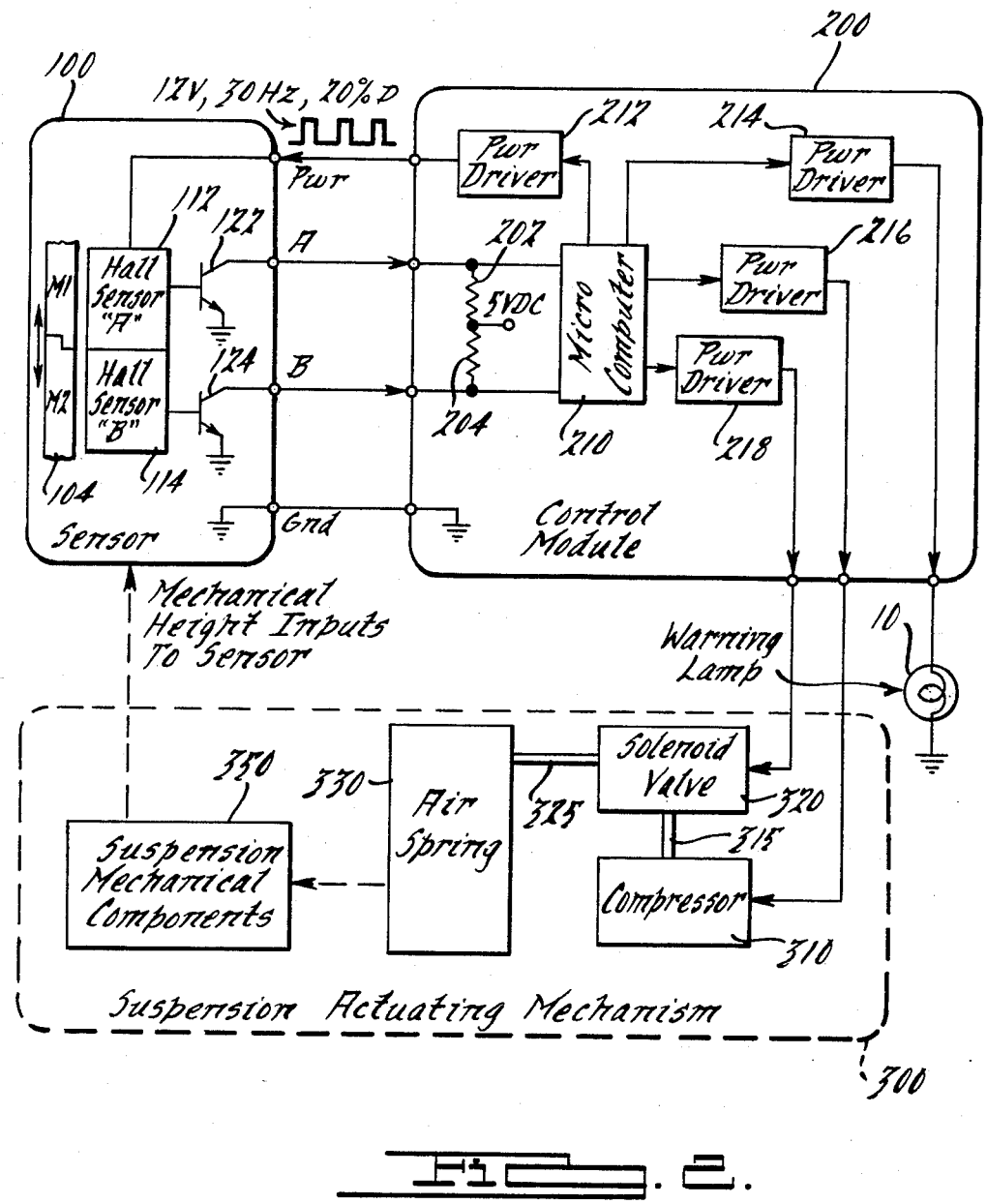
FIG. 2 is a block diagram illustrating the central components of an air suspension height control system, with respect to a single height sensor and air spring.

In FIG. 2, a block diagram of the air suspension height control system is illustrated in which a single height sensor 100 is electrically connected via a wiring harness to the control module 200. The control module 200 is electrically connected to control the air suspension actuating mechanism 300 and a warning lamp 10 that is conveniently mounted in the vehicle passenger compartment for operator attention, in the event of a sensor failure. The warning lamp 10 is also used in various ways to identify tests and faults during the diagnostic mode, described later.

The height sensor 100 is mounted between sprung and unsprung components of the vehicle, such as indicated in FIG. 1. The housing, of the height sensor 100, includes Hall sensors 112 and 114 as well as corresponding output transistors 122 and 124 mounted within the housing in a nonmoveable relationship with respect thereto. The housing is attached to a sprung component of the vehicle, such as the body. A moveable sensor rod 104, of the height sensor 100, contains a pair of oppositely polarized magnets M1 and M2 disposed for longitudinal movement adjacent to the Hall sensors 112 and 114. The movable magnets M1 and M2 provide the magnetic actuating field for the Hall sensors. The sensor rod 104 is mechanically connected for longitudinal movement to the unsprung suspension components, which may be a rear axle housing 355 or the lower arm 350, as shown in FIG. 1. In any event, the sensor rod 104 is caused to be repositioned longitudinally as the distance between the sprung and unsprung components changes due to load pressures on the vehicle.

The Hall sensors 112 and 114, when energized, provide biasing to output transistors 122 and 124 respectively. The output of each Hall sensor reflects the longitudinal position of the sensor rod 104 as communicated by the magnetic field intensity, at each Hall sensor, contributed by the adjacent magnets M1 and M2.

The collectors of each of the output transistors 122 and 124 are connected via sensor lines A and B to sensor input terminals of a microprocessor computer 210 in the control module 200. Load dropping resistors 202 and 204 are connected from a 5-volt regulated DC source to junctions between respective sensor lines A and B and separate sensor input terminals of the microprocessor computer 210. The load dropping resistors 202 and 204 combine with respective sensor output transistors 122 and 124 to provide a binary single bit of information at each of the sensor input terminals of the microprocessor computer 210 in the form of a "1" at a 5-volt DC level or a "0" at an approximate zero voltage level.

TABLE

| HEIGHT CONDITION | ENERGIZED SENSOR LOGIC | | | DEENERGIZED SENSOR LOGIC | |
|---|---|---|---|---|---|
| | A | B | | A | B |
| REBOUND (HIGH) | 1 | 0 | (valid) | 1 | 1 |
| TRIM (OK) | 0 | 0 | (valid) | 1 | 1 |
| JOUNCE (LOW) | 0 | 1 | (valid) | 1 | 1 |
| | 1 | 1 | (invalid) | 1 | 0 |
| | | | (invalid) | 0 | 0 |
| | | | (invalid) | 0 | 1 |

The TABLE illustrates three valid sets of binary data bits that may be provided by each height sensor 100 according to three corresponding ranges of measurement. When the vehicle is in the REBOUND condition, due for instance to the vehicle having a lightened load, the sensor rod 104 is moved downward with respect to the Hall sensors 112 and 114. In that position, the opposing magnets M1 and M2 also are at a lower position so as to cause the Hall sensor 112 to bias the output transistor 122 in a nonconductive state and thereby provide a "1" data bit to the "A" sensor input terminal of the microprocessor computer 210. At that same position, the Hall sensor 114 is caused to bias the output transistor 124 in a conducting state so that a "0" data bit is provided to the "B" sensor input terminal of the microprocessor computer 210. Similarly, when the vehicle is at TRIM, the sensor rod 104 is positioned in such a manner that Hall sensors 112 and 114 respectively cause output transistors 122 and 124 to be in their conducting states to provide "0" data bits at both "A" and "B" sensor input terminals of the microprocessor computer 210. When the vehicle is in its JOUNCE condition, due for instance to high load forces, the sensor rod 104 is moved in an upward direction to cause the Hall sensors 112 and 114 to respectively bias output transistors 122 and 124 in conducting and nonconducting states and thereby respectively provide "0" and "1" data bits to the "A" and "B" sensor input terminals of the microprocessor computer 210.

In the event the wiring harness, between the height sensor 100 and the control module 200 and which includes the power and sensor lines, becomes disconnected or otherwise opened, a high volt level 1 will be present on each of the sensor inputs of the microprocessor computer 210. A set of "1", "1" data bits is defined as an invalid set, since it does not reflect any valid measurement from the height sensor during its electrically energized condition.

During the de-energized condition of the height sensor, the output transistors 122 and 124 are biased in their nonconducting states. Therefore, the only valid set of data bits for any position of the height sensor in its de-energized condition will be "1", "1". This corresponds to the defined invalid set of data bits that may occur when the height sensor is energized. In fact, if the wiring harness between the height sensor and the control module develops a short or other grounding problem, invalid sets of data bits may appear at the input terminals of the microprocessor computer 210 during the de-energized state of the height sensor. Those defined invalid sets of data bits also appear in the TABLE.

Figure 3:
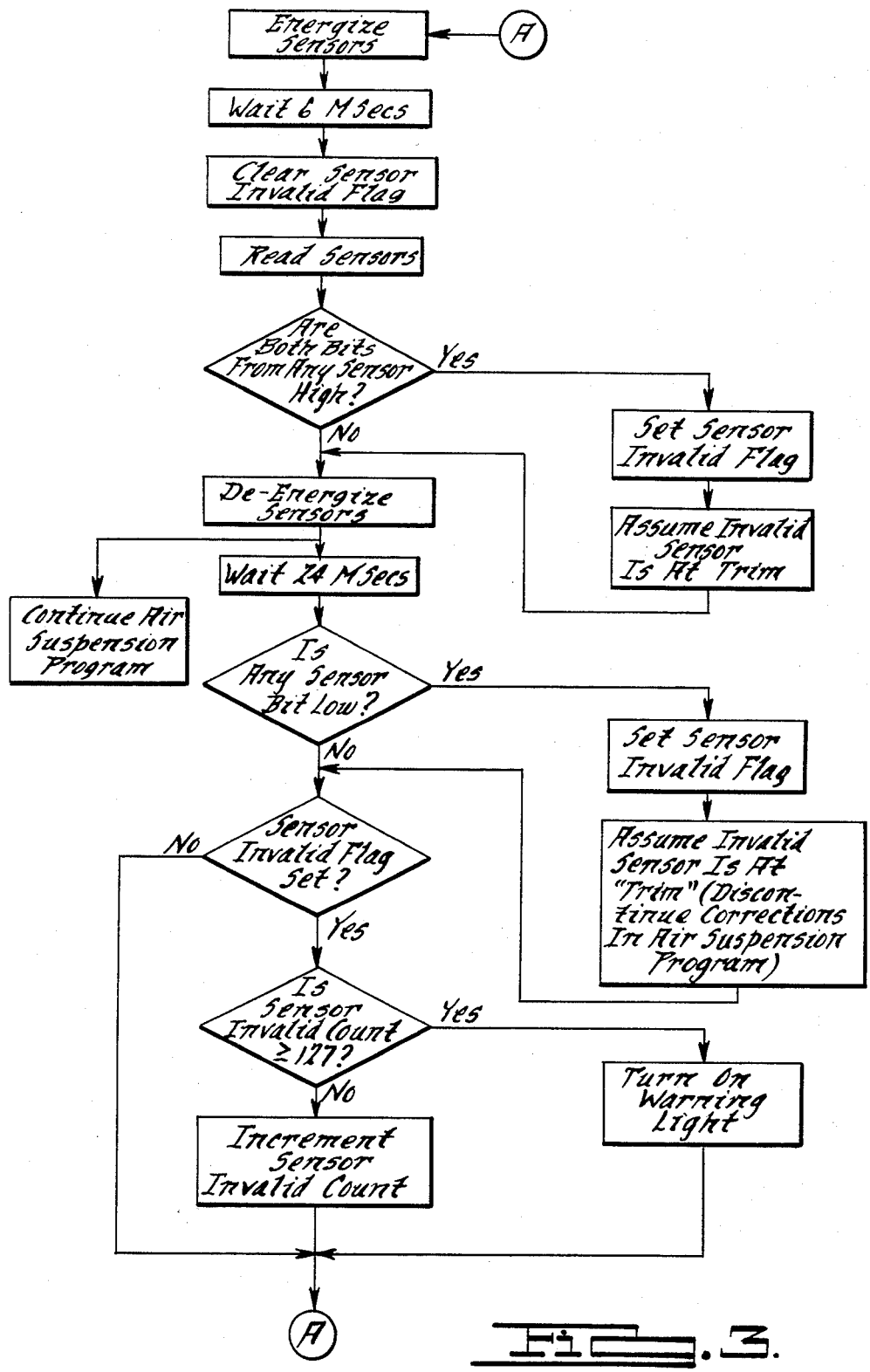
FIG. 3 is a flow diagram illustrating the various steps followed in validating readings from each height sensor.

Referring to the flow diagram shown in FIG. 3, the microprocessor computer 210 is programmed to energize all of the height sensors by use of a 12-volt, 30 Hz pulse cycle having a 20% duty cycle. This means that a 12 volt pulse is applied to the height sensors for a period of approximately 6.7 ms of each 33 ms cycle and the sensors are de-energized for approximately 26.3 ms out of each cycle. Following energization of the sensors, the microprocessor computer 210 waits approximately 6 ms and then clears a "sensor invalid" flag in an appropriate internal register. The data bits available at the sensor inputs of the microprocessor computer 210 are then read for each height sensor connected thereto. During the time the sensors are energized, each set of sensor data bits is compared with the defined invalid set to determine equality. If any sensor provides a set of data bits where both bits are high (1,1) then the sensor invalid flag is set in an internal register of the microprocessor computer 210 and the air suspension control program for that particular height sensor is inhibited by assuming that the invalid sensor is at a TRIM position. The height sensors are then de-energized and the air suspension control program continues during this de-energized portion of the cycle. After a period of approximately 24 ms, the bit levels present at the sensor inputs of the microprocessor computer 210 are read to determine if any of the bits from the sensors are at at a low (0) level. If any bit is low, the sensor invalid flag is set and that particular sensor is subsequently ignored by the air suspension control program as being at a TRIM level. If a sensor invalid flag is set, that occurrence is incremented in an internal invalid sensor count register within the microprocessor computer 210. The foregoing steps are repeated for each cycle of energization and de-energization. When the invalid sensor count register has been incremented to a value that is greater than, in this case, 126, the microprocessor computer 210 provides an output signal to a power driver 214 which energizes a warning lamp 10 in the viewing range of the operator of the vehicle. Such a warning thereby notifies the operator that one of the height sensors is not providing proper signals to the air suspension controller and therefore requires service to correct the fault.

During its operational mode, the microprocessor computer 210 is programmed to respond to the height sensor readings and to monitor the conditions of the door switches 208 and 209, the ignition switch 206 and the brake sensor switch 207 as conditional to providing adjustment service commands to the appropriate air solenoid valve or the air compressor 310. For instance, when a loaded luggage compartment is unloaded, the rear of the vehicle raises up due to the lessened load and makes the vehicle unlevel. The control microprocessor computer 210 does not respond to the rear height sensor 100″ reading by opening the air valve solenoids on the air springs 330″ and 330‴ to vent a portion of the air out unless all the vehicle doors are closed.

Similarly, the status of the ignition switch 206 and that of the brake sensor switch 207 are monitored by the microprocessor computer 210 to provide conditional responses to the height sensor readings. Those operational responses are not discussed herein, since they are not a specific part of the present invention nor is such a discussion necessary in order to understand the present invention. However, the present invention utilizes and checks the operation of door switch 208, ignition switch 206 and brake sensor switch 207 during the performance of the diagnostic method.

The microprocessor computer 210 employed in the foregoing air suspension embodiment contains an internal timing circuit, whereby it remains energized for a period of approximately one hour after the vehicle ignition system is turned off. If a service technician wishes to have the microprocessor computer 210 enter its diagnostic mode, it must first be energized. Therefore, if the vehicle ignition switch 206 has been in an off condition for more than one hour, the technician will have to turn it ON, then OFF, to commence the following procedures.

Figure 4:
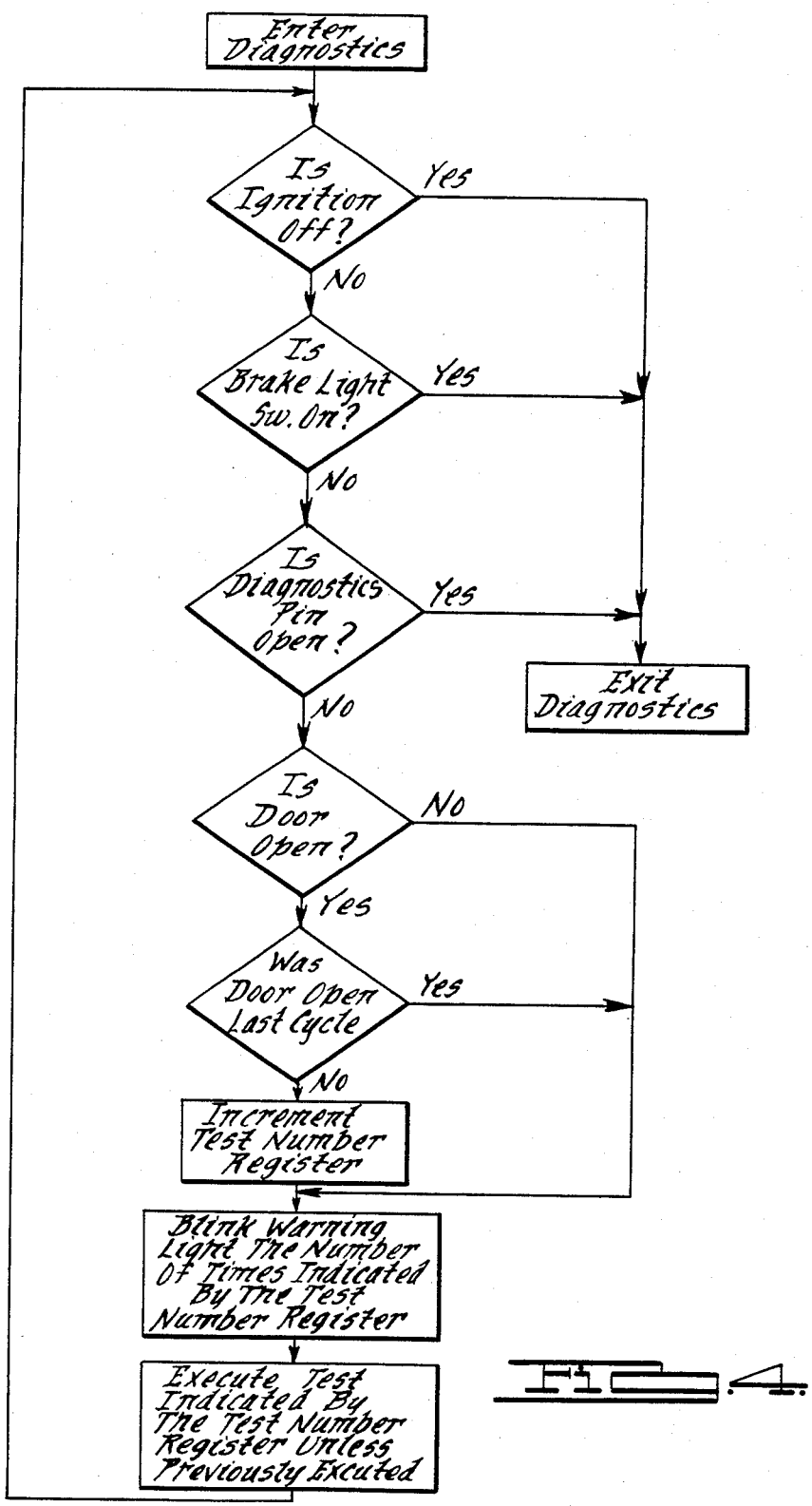
FIG. 4 is a flow diagram illustrating the various conditions which must be met in the system embodiment in order to perform the diagnostic method of the present invention.

In the diagnostic mode shown in FIG. 4, the microprocessor computer 210 is programmed to sequentially cycle the various components of the illustrated air suspension system. However, in order to switch the microprocessor computer 210 to its diagnostic mode, a diagnostic "pigtail" 204 is changed from an ungrounded state to a grounded state by connecting it to the vehicle body. Subsequently, the vehicle ignition switch 206 is turned to an "ON" or "RUN" position and the vehicle doors are closed. At that point, the diagnostic mode is entered and the system waits for an instruction from the technician before entering the first test. When the technician opens and closes the door and thereby activates the door sensor switch 208 or 209, an internal test number register is incremented and the warning light 10 is periodically flashed on and then off to indicate that the diagnostic mode is performing test number one.

Test number "one", in this case, is an exercise of the set of rear air springs 330″ and 330‴ and the single rear height sensor 100″. Tests "two" and "three" respectively exercise the right front air spring 330′ along with its associated height sensor 100′ and the left front air spring 330 along with its associated height sensor 100. Test number "four" cycles the air compressor solenoid on and off. Tests "five", "six", "seven", "eight" and "nine" cycle individual air spring solenoids and a bleed solenoid valve located within the compressor 310. Test number "ten" checks the brake switch and, if functioning properly, causes the diagnostic mode to be exited. The order of tests described herein is a matter of choice and could be differently ordered through appropriate program changes.

Figure 5A:
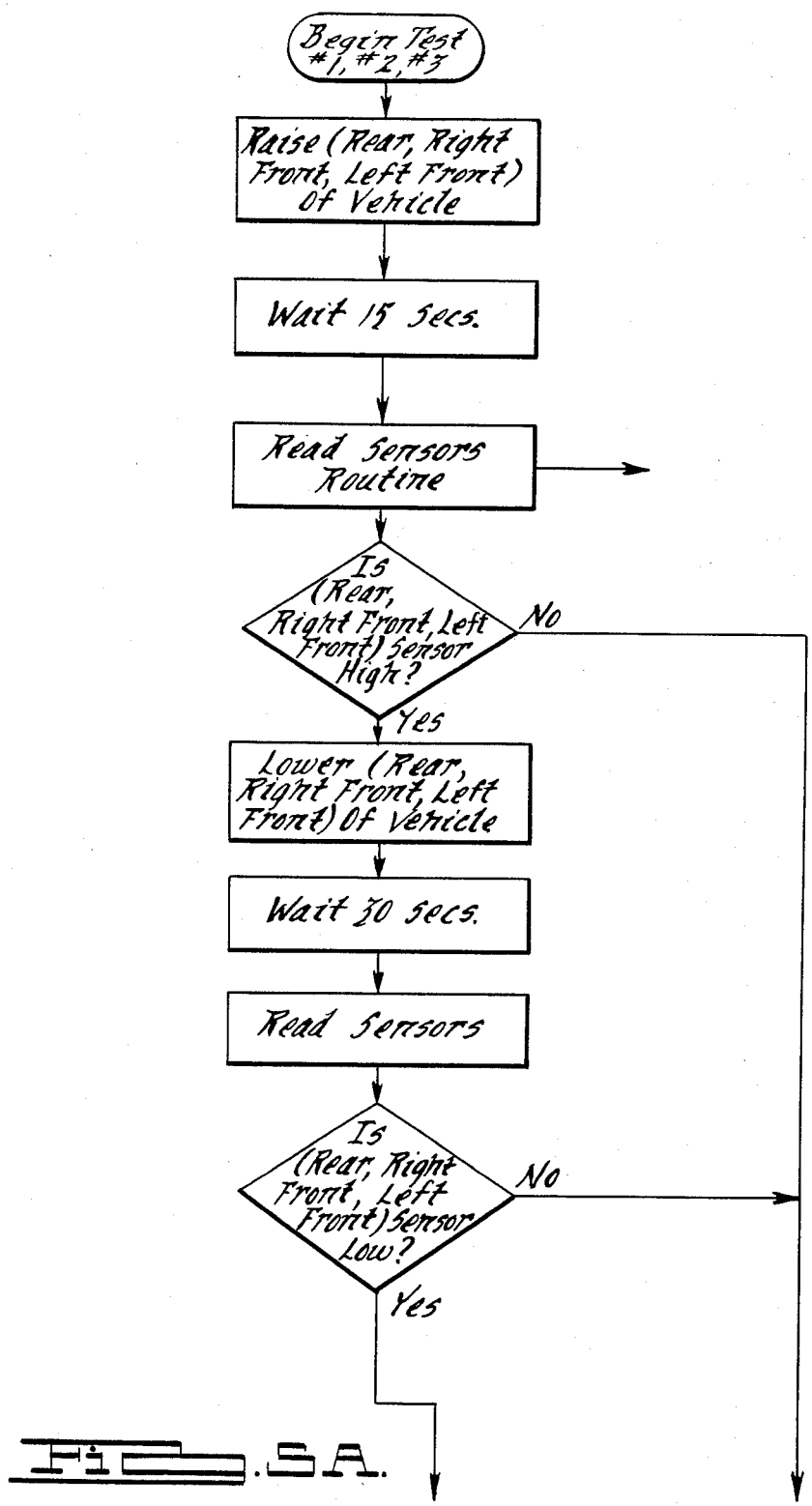
FIGS. 5a and 5b constitute a flow diagram illustrating the various steps carried out in the present invention to test the air suspension system at each front corner and the rear portion of the vehicle.
Figure 5B:
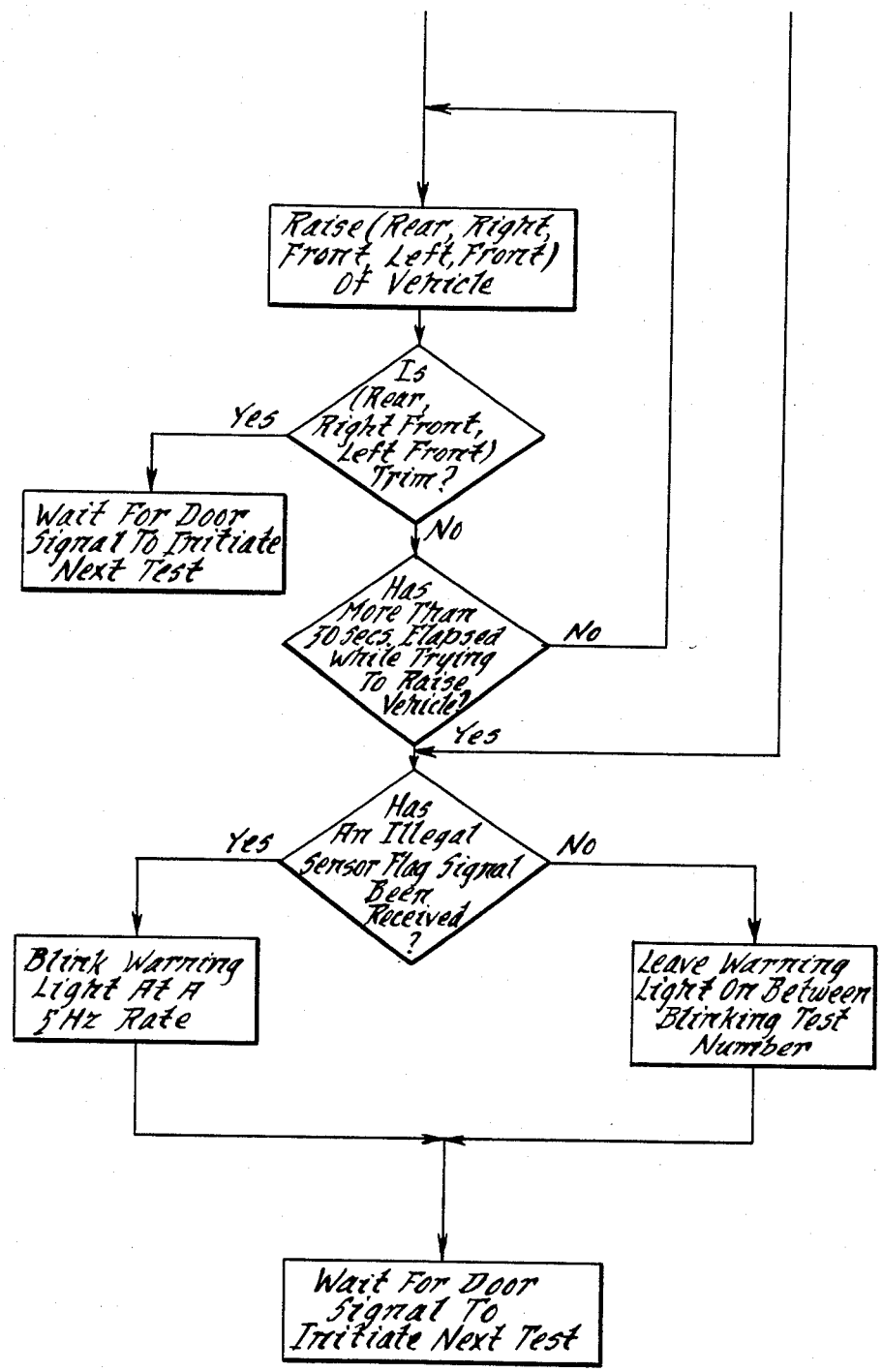

FIGS. 5a and 5b constitute a flow diagram illustrating the various steps carried out in the present invention to test cycle the air suspension system for tests one, two and three. In this instance, test one involves test cycling the rear set of air springs of the vehicle and reading the rear height sensor. Tests two and three are performed in an identical manner for the respective right front and left front air springs and height sensors of the vehicle. When the diagnostic system executes the test indicated by the test number register, the first step is to raise the rear of the vehicle by turning on the air compressor 310 for a first predetermined period of time (on the order of 15 seconds) and opening the electrically controllable solenoid air valves for respective air springs 330″ and 330‴ to allow the compressed air to enter the respective rear air springs. After the first period of time, the rear height sensor measurement is read and validated, utilizing the method steps shown in FIG. 3. At this point in the method, the air springs 330″ and 330‴ should be fully inflated and the height sensor 100″ should indicate a rebound (high) position. A comparison is made of the height sensor measurement output with the predicted measurement to determine whether the rear of the vehicle has reached its high position. If the sensor has not reached its highest position, a fault warning is provided to the technician by energizing the warning lamp 10 for a long period of time between those periods when the test number is flashed. If, on the other hand, the sensor reading provides an invalid measurement, the warning lamp 10 is blinked at a 5 HZ rate in order to indicate to the operator that the rear sensor 100" is providing an invalid output reading.

If the height sensor provides a valid reading indicating that the rear of the vehicle is at its high position, the solenoid air valves on the rear air springs 330" and 330"' are opened, with the air compressor in its de-energized state, in order to bleed air from those air springs and cause the rear of the vehicle to be lowered to its lowest position. After a period of approximately 30 seconds the sensors are then read and the signals therefrom are validated according to the method steps illustrated in FIG. 3. The output of the rear height sensor 100" is compared with the predicted jounce (low) position reading. If the height sensor does not provide a low output signal at this time, a fault warning is provided through warning light 10 by the same mechanism described above. If, on the other hand, the rear height sensor 100" indicates that the rear of the vehicle is at its lowest position, then the air compressor is turned on and the corresponding air solenoid valves of the air springs 330" and 330"' are open to allow air to be pumped into those air springs. During the time that the air compressor is turned on and the solenoids for the rear air springs 330" and 330"' are energized, the height sensor 100" is monitored until it indicates that the rear of the vehicle is at its trim position. If the rear height sensor 100" does not indicate that the vehicle has reached its trim position within a period of approximately 30 seconds, a fault warning will be output by the warning light 10 in the same manner as indicated above. Accordingly, in the first test, the warning light 10 provides an indication that the diagnostic mode is performing test number one by being flashed once, followed by a relatively long off period for each indication cycle. If, at any time during the first test, a fault is detected due to a faulty height sensor output measurement or a non-responsive function by the air springs, the fault warning light 10 will be blinked at a high rate during its normally de-energized state or be continually energized for a relatively long period of time between test number indications. In that manner, the technician is able to detect and distinguish faults occurring in the height sensors and air springs.

The technician then opens and closes the vehicle door to activate the door open sensor switch 208 and sequence the system to the second diagnostic test. Test number two is performed in the same manner as test number one except that the solenoid valve for the right front air spring 330' is controlled and the height sensor 100' is read at the appropriate times. Similarly, the method is sequenced to the third test when the technician opens and closes the vehicle door activating the door open sensor 208. Test number three similarly follows the steps illustrated in FIGS. 5a and 5b whereby air spring 330 at the left front of the vehicle is cycled and the corresponding height sensor 100 is read to determine the positions of the vehicle at various times during the method.

Test number four is a check of the air compressor 310 as controlled by its electrically energized relay. During this test, as well as the following tests five through nine, the warning lamp 10 will only flash the test number. Individual faults in the system are observable by the technician, since each test causes individual components to be cycled. In test number four, the steps shown in FIG. 6 are followed, wherein the air compressor relay is energized on and off at a 0.25 HZ rate. After approximately 50 cycles, the relay is no longer energized and the system waits for the technician to open the door and sequence the system to the next test. In this test, the technician should hear the audible sound of the compressor being energized.

Tests five, six, seven, eight and nine follow the sequence shown in FIG. 7, wherein the respective air vent valve, left front air spring valve, the right front air spring valve, the right rear air spring valve and the left rear air spring valve are cycled at an approximately 0.5 HZ rate. During each of those tests, air should be heard escaping through the system and the solenoids should be heard to open and close.

In test number ten, the steps shown in FIG. 8 indicate that the brake sensor switch 207 is activated by the technician by depressing the brake pedal. If the brake sensor switch 207 is operating properly, the diagnostic mode of the microprocessor computer 210 is discontinued and the computer enters its operational mode.

Throughout the diagnostic mode, the microprocessor computer 210 provides that the depression of the brake sensor switch 207 as an escape signal from the diagnostic mode. In operation, the technician may sequence through the diagnostic method by opening and closing the vehicle door and activating sensor switch 208. Each time the door is open, it interrupts the present test and increments the test number register so that when the door is closed, the system enters the next sequential test. Therefore, when a vehicle is brought to a technician for service and, for instance, one of the corners of the vehicle is low, the technician can sequence the diagnostic system to perform a test of that particular corner of the vehicle and perform subsequent solenoid tests to pinpoint the exact component that is faulty.

It will be readily apparent that many modifications and variations may be implemented without departing from the scope of the novel concept of this invention. Therefore, it is intended by the appended claims to cover all such modifications and variations which fall within the true spirit and scope of the invention.

What is claimed is:

1. A method of diagnosing an air suspension system of an automotive vehicle, which includes a plurality of air pressure responsive springs connected between sprung and unsprung components of the vehicle, and an electrically controlled solenoid air valve on each air spring, at least one electrically energized height sensor mounted between sprung and unsprung components to measure the height condition of the sprung portions of the vehicle with respect to its unsprung components and output a signal indicative of said measurement, a compressor unit for responsively pumping air to each solenoid valve and a control circuit programmed for an operational mode wherein it periodically energizes each said height sensor, reads each said height sensor measurement output and responsively energizes said compressor or any of said solenoid air valves as required to maintain the sprung portion of said vehicle at a predetermined height condition, and a diagnostic mode, comprising the steps of:

switching said control circuit into its controlled diagnostic mode;

energizing said compressor for a first predetermined period of time;

opening a first electrically controllable solenoid air valve for each of at least one predetermined air spring;

reading the corresponding height sensor measurement output at the end of said first period of time;

comparing said height sensor measurement output with a predetermined measurement indicating a fully raised condition for said at least one predetermined air spring;

with said compressor in its de-energized state, opening said first electrically controllable solenoid air valve for each of said at least one predetermined air spring for a second predetermined period of time;

reading the corresponding height sensor measurement output at the end of said second predetermined period of time;

comparing said height sensor measurement with a predetermined measurement indicating a fully lowered condition for said at least one predetermined air spring;

energizing said compressor for a third predetermined period of time;

opening said first electrically controllable solenoid air valve for a third predetermined period of time;

reading said corresponding height sensor measurement output during said third predetermined period of time;

comparing said height sensor measurement with a predetermined measurement corresponding to a desired height condition;

closing said valve and de-energizing said compressor when said height sensor reading is equal to said measurement corresponding to said desired height condition; and providing a fault warning whenever any of the preceding comparing steps results in an inequality at the end of the respective first, second and third time periods.

2. A method as in claim 1, wherein the steps are repeated for each air spring and its associated height sensor.

3. A method as in claim 1, wherein said steps of reading said height sensor include the following steps:

defining three valid measurement ranges and three correspondingly valid measurement output signals;

providing an electrical logic circuit whereby said three valid output measurements from said height sensor take the form of three separate two-binary bit signals;

defining an invalid measurement from said height sensor and said electrical logic circuit as a separate fourth two-bit binary bit signal;

electrically energizing said height sensor;

reading the range of measurement as indicated by the measured output signals; and comparing the two bits of the output signal with said defined invalid measured signal and outputting a sensor fault signal whenever this comparison step indicates equality.

4. A method as in claim 3, wherein said sensor fault signal and said fault warning are humanly distinguishable.

5. A method as in claim 1, further including the steps of:

repeatedly energizing and de-energizing said air compressor for a fourth predetermined period of time to provide an audible indication of its functional performance.

6. A method as in claim 1, further including the steps of:

repeatedly energizing and de-energizing a selected solenoid air valve for a fifth predetermined period of time to provide an audible indication of its functional performance.

* * * * *